United States Patent [19]

Mooney

[11] 4,386,525

[45] Jun. 7, 1983

[54] DEVICE FOR AND METHOD OF DETECTING LEAKS IN A LIQUID STORAGE RESERVOIR

[76] Inventor: Joseph R. Mooney, 33 Hawk St., New Orleans, La. 70124

[21] Appl. No.: 414,305

[22] Filed: Sep. 2, 1982

[51] Int. Cl.³ ............................................. G01M 3/32
[52] U.S. Cl. ........................................ 73/49.2; 73/292
[58] Field of Search ......................... 73/49.2, 292, 296

[56] References Cited

U.S. PATENT DOCUMENTS

| | | | |
|---|---|---|---|
| 2,760,373 | 8/1956 | Quist | 73/292 X |
| 3,580,055 | 5/1971 | White | 73/49.2 |
| 4,186,591 | 2/1980 | Mooney | 73/49.2 |
| 4,281,534 | 8/1981 | Hansel | 73/49.2 |
| 4,300,388 | 11/1981 | Hansel et al. | 73/49.2 |

Primary Examiner—E. R. Kazenske
Assistant Examiner—Joseph W. Roskos
Attorney, Agent, or Firm—Walker & McKenzie

[57] ABSTRACT

An underground storage tank is filled with liquid (e.g., gasoline) until the level of the liquid in the tank rises into the fill-pipe leading from the surface of the ground to interior of the tank. The change in elevation of the liquid in the fill-pipe is monitored over a period of time. The temperature of the liquid within the tank is monitored over the same period of time. Evaporation from the surface of the liquid in the fill-pipe is monitored over the same period of time. A change in elevation of the liquid in the fill-pipe below the level caused by expansion or contraction due to temperature change, and by evaporation loss, indicates a leak in the tank.

10 Claims, 5 Drawing Figures

DEVICE FOR AND METHOD OF DETECTING LEAKS IN A LIQUID STORAGE RESERVOIR

BACKGROUND OF THE INVENTION

1. Field of the Invention

The present invention relates generally to devices for and methods of detecting leaks in tanks for storing gasoline, oil and other liquids.

2. Description of the Prior Art

Heretofore, a number of procedures and devices have been used to detect leaks in underground liquid storage reservoirs. Mooney, U.S. Pat. 4,186,591 discloses a prior invention of the present inventor in which an underground liquid storage reservoir is filled with liquid until the level of the liquid rises into one or more hollow tube members extending upwardly above the top portion of the tank and communicating the interior of the tank with the ground surface; any change in the level of the liquid in the tube members over a period of time is measured; and any change in the temperature of the liquid in the reservoir over the same period of time is also measured. The present invention is an improvement over the device and method disclosed in U.S. Pat. No. 4,186,591.

The inventor is also aware of the following patents that relate, in general, to the present invention; Hansel, U.S. Pat. Nos. 4,281,534 and Hansel, 4,300,388. These two Hansel patents relate to a sensor for and a method of measuring leakage in a tank by measuring any change in mass displacement over a period of time. The preferred sensor design is such as to compensate for changes due to evaporation of the liquid and changes occurring in density and the level of the liquid due to temperature variations. In general, the sensor comprises a cup portion for being suspended within the tank from a balance arm or other mass displacement detector. Compensation for evaporation results because any evaporation that occurs will occur from both the surface of the liquid in the tank and from the surface of liquid in the cup. The buoyancy of the liquid on the sensor is a function of the sensor diameter, but since the inside diameter of the cup is essentially the same as the outside diameter of the sensor, the evaporative loss of liquid from the cup will compensate for the buoyancy change due to evaporation of the liquid in the tank. Thus, when the liquid in the tank evaporates, its buoyant force is reduced and the sensor becomes heavier, but the evaporation of the liquid in the cup reduces the weight of the sensor by substantially the same amount and no change in the weight of the sensor occurs. Thus, these two Hansen patents relate to an automatic compensation method and does not involve measuring change in the elevation of liquid due to evaporation.

The prior art, taken as a whole, does not disclose or suggest the present invention.

SUMMARY OF THE INVENTION

The present invention is directed toward improving upon prior devices for and methods of detecting leaks in liquid storage reservoirs. The concept of the present invention is to fill a liquid storage reservoir with liquid until the level of the liquid rises into any upwardly extending tube member which communicates with the interior of the reservoir (the tube member is preferably a standard part of the reservoir piping, e.g., the fill-pipe, rather than a device added to the system just for use in the test for leaks) then measuring any change in the level of liquid in the tube member over a period of time while, at the same time, measuring any change in the temperature of the liquid in the reservoir and determining any change of elevation of the surface of the liquid in the tube member due to evaporation from that surface over the same period of time.

The overall objective of the present invention is to provide a more accurate, faster and more certain method of and device for determining the integrity of a storage tank with relatively simple equipment and procedures.

Leakage of valuable and/or hazardous liquid from storage tanks is a critical problem creating environmental and safety problems and increasing the cost of such liquid. Thus, there is a need for efficient and economical leak detection methods and equipment for underground gasoline storage tanks and the like from the standpoint of environmental protection, energy conservation, safety and economics.

DESCRIPTION OF THE PREFERRED EMBODIMENT

Figure 1:
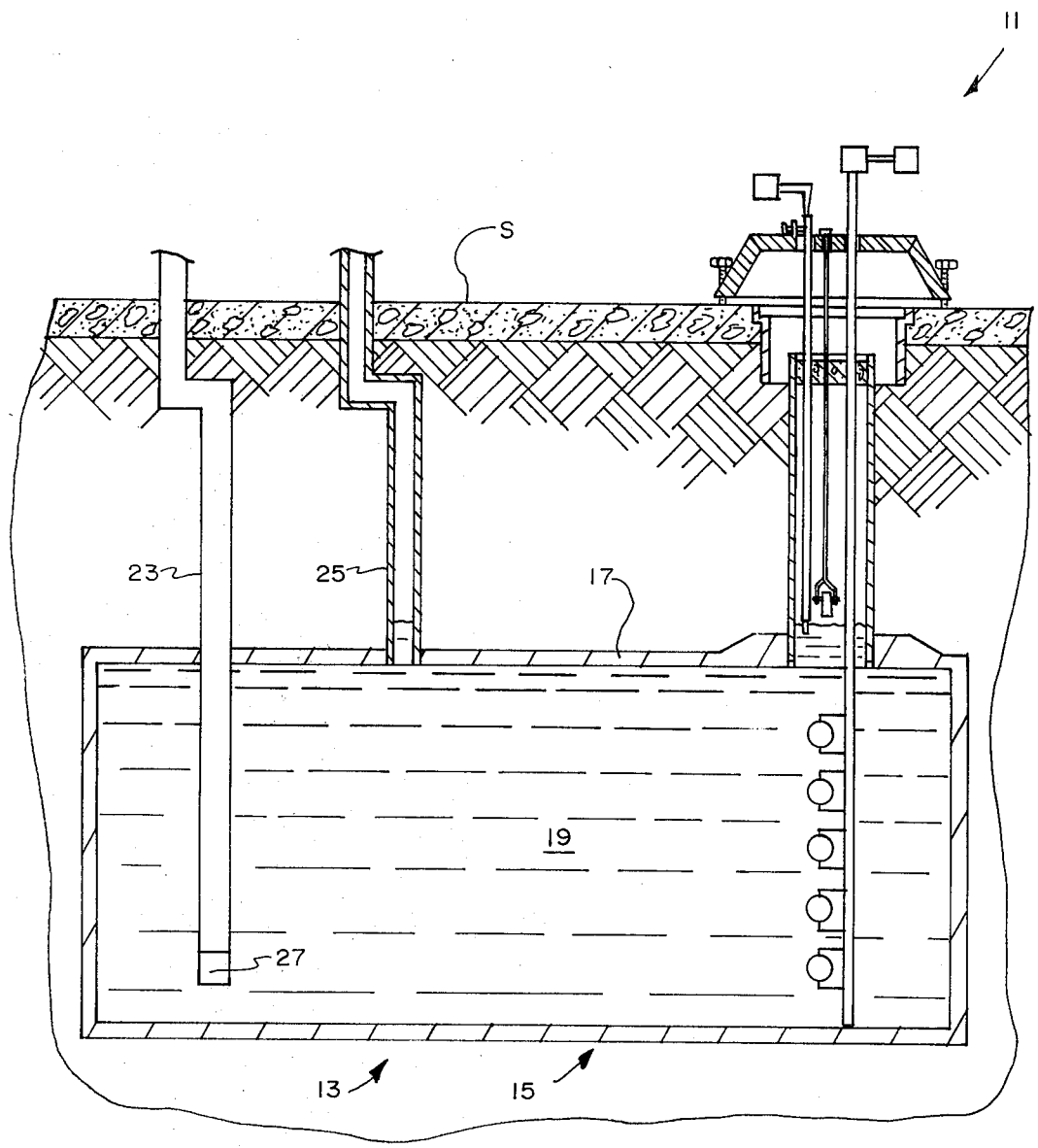
FIG. 1 is a side elevational view of the improved device for detecting leaks in a liquid storage tank of the present invention shown coupled to a sectionalized liquid storage tank.

The improved device 11 of the present invention is for use in detecting leaks in underground liquid storage reservoirs 13 of the type including a hollow tank 15 having a top portion 17, and including at least one hollow tube member extending upwardly above the top portion 17 of the tank 15 and communicating with the interior 19 of the tank 15. The reservoir 13 typically includes a first hollow tube member 21 commonly referred to as a "fill-pipe" for allowing the tank 15 to be filled with liquid such as gasoline, a second hollow tube member 23 for allowing liquid such as gasoline to be pumped from the tank 15, and a third hollow tube member 25 commonly referred to as a "vent-pipe" for allowing air and vapors to enter and exit the interior 19 of the tank 15. A submergible pump 27 may be attached to the end of the second hollow tube 23 within the interior 19 of the tank 15 for pumping liquid through the second tube member 23. The reservoir 13 may be of the type positioned below the surface S of the ground.

The device 11 includes indicator means for detecting and indicating any change in the level of the liquid in one of the tube members over a period of time. The indicator means may be of various constructions well-known to those skilled in the art such as that disclosed in the above referenced Mooney 4,186,591 patent. Preferably, the indicator means includes a capacitance probe means 29 coupled to a digital read-out meter 31. The probe means 29 is preferably adjustably supported within the first tube member 21 by way of a support assembly 33 positioned on the surface S of the ground above the first tube member 21. The support assembly 33 preferably includes adjusting screw members 35 for use in positioning the probe means 29 in a plumb position within the first tube member 21 and preferably includes clamp means 37 for adjustably clamping the probe means 29 to the support assembly 33. The probe means 29 is electrically coupled to the meter means 31 by way of electrical wires 39 or the like. The specific construction and operation of the probe means 29 and meter means 31 is well-known to those skilled in the art.

The device 11 also includes temperature sensing means for indicating any change in temperature of the liquid in the reservoir 13 over the same period of time that the indicator means indicates any change in the level of liquid in the tube member 21. The temperature sensing means 35 may be of any typical type well-known to those skilled in the art such as that disclosed in the above referenced Mooney 4,186,591 patent. Preferably, the temperature sensing means includes a plurality of thermistors 41 coupled to a sensitive electric meter 43 through a selector switch means 45 and an electric circuit which allows each of the thermistors 41 to be individually electrically coupled the electric meter 43 whereby the electric meter 43 can be used to determine temperature of the liquid adjacent each thermistor 41 to arrive at an average temperature. The specific construction and operation of the thermistors 41, meter 43, and switch means 45 is now well-known to those skilled in the art.

The improvement to the device 11 of the present invention includes a monitor means 47 for allowing any change of elevation of the surface of the liquid in one of the tube members due to evaporation from that surface over the same period of time that any change in the level of liquid in that member is detected and indicated to be determined. The monitor means 47 preferably includes a cup 49 for holding a specific amount of liquid and for being positioned in the tube member 21 just above the surface of the liquid in the tube member 21. The cup 49 is preferably calibrated. Thus, the cup 49 preferably has indicia 51 for indicating the amount of liquid therein. The cup 49 is preferably transparent to allow the amount of liquid therein to be readily compared to the indicia 51 and be determined. The monitor means 47 preferably includes suspension means for suspending the cup 49 within the tube member 21. The suspension means may include a cable member 53 for being attached to the cup 49 in any manner apparent to those skilled in the art and an anchor member 55 attached to the end of the cable member 53 opposite the cup 49 for anchoring the cable member 53 and cup 49 to the support assembly 33 or the like. The cup 49 may be constructed in any manner apparent to those skilled in the art such as by being cast or molded out of transparent glass with the indicia 51 molded therein and with a pair of outwardly extending pegs 56 or the like for being attached to the cable member 53. The cable member 53 may be constructed of any substantially strong material such as rope, wire or the like and preferably has a bifurcated end 53' for attachment to the pegs 56 of the cup 49. The anchor member 55 may consist simply of any block-like member to which the upper end 53" of the cable member 53 is securely attached and which is of a size which will not fall through the tube member 21. The anchor member 55 may be constructed so as to be securely positioned on the support assembly 33 of the indicator means.

The device 11 may include an evaporation seal means 57 for reducing evaporation loss from the reservoir 13.

Figure 2:
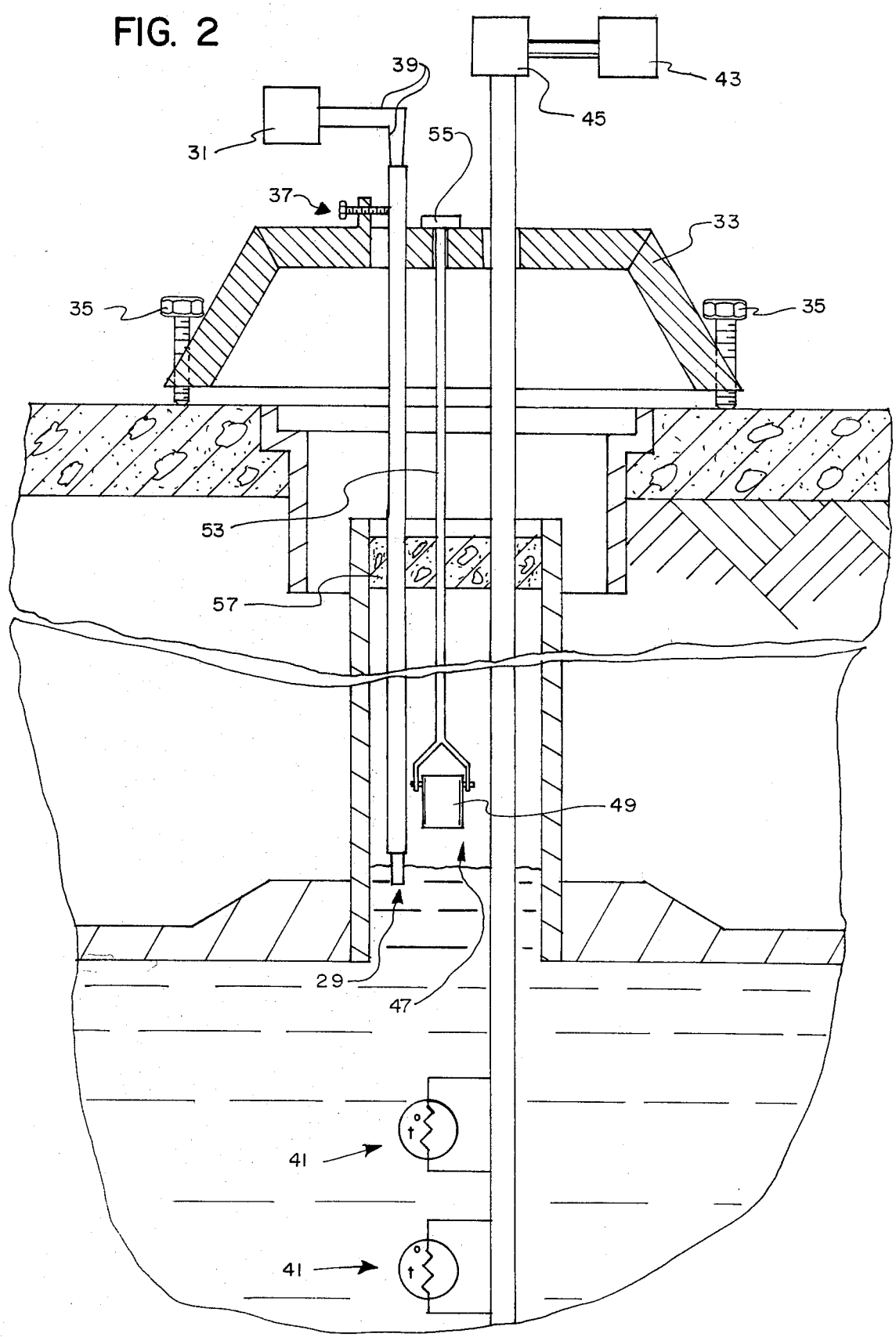
FIG. 2 is an enlarged view of a portion of FIG. 1 showing portions of the device broken away to display the interior thereof.
Figure 3:
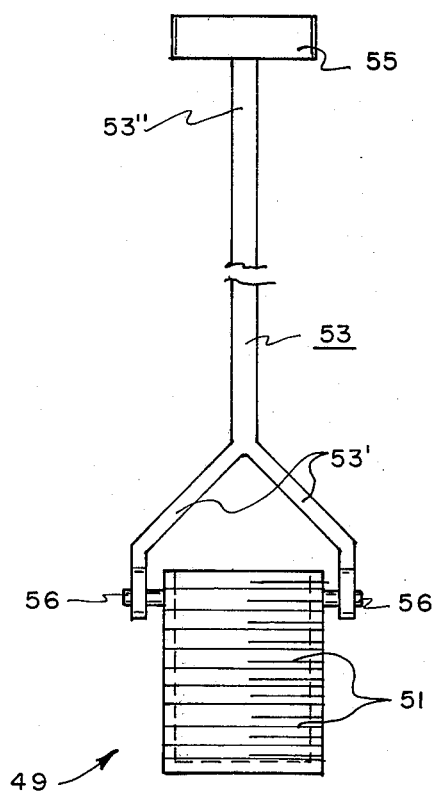
FIGS. 3 and 4 are enlarged side elevational views of a portion of the improved device of the present invention.
Figure 4:
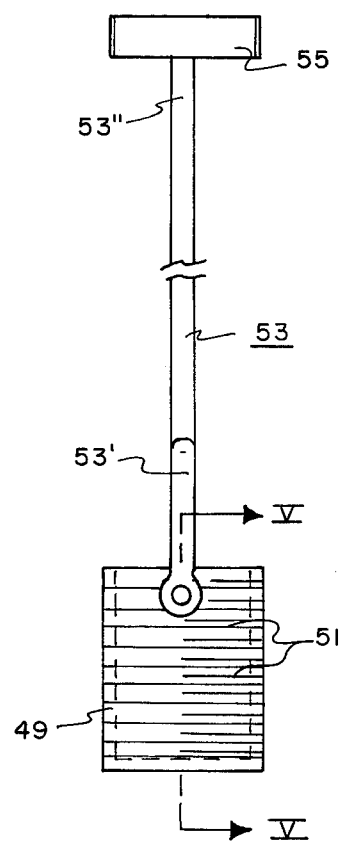
Figure 5:
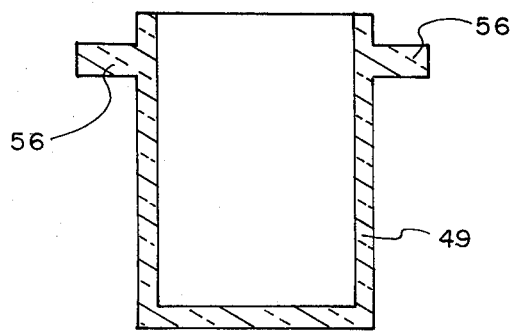
FIG. 5 is a sectional view as taken on line V—V of FIG. 4.

The evaporation seal means 57 may consist of a flexible sponge-like member for being stuck into the first tube member 21 about various structure of the device 11 as shown in FIG. 2 to thus inhibit evaporation of the liquid from the interior 19 of the tank 15.

The method of the present invention is quite simple and consists of the following steps: (1) filling the reservoir 13 with liquid until the level of the liquid rises into the tube member 21; (2) measuring any change in the level of the liquid in the reservoir 13 and tube member 21 over a period of time; and (3) measuring any change in the temperature of the liquid in the reservoir 13 over the same period of time that any change in the level of the liquid in the tube member 21 is measured. The improvement to the method of the present invention comprises the step of determining any change in elevation of the surface of the liquid in the tube member 21 due to evaporation from that surface over the same period of time that any change in the level of the liquid in the tube member is measured. The step of determining any change of elevation due to evaporation preferably includes the following steps: (1) filling the cup 49 with a specific amount of the liquid; (2) suspending the cup 49 within the tube member 21 at a position just above the surface of liquid in the tube member 21; and (3) measuring the amount of liquid remaining in the cup 49 after the same period of time that any change in the level of the liquid in the tube member 21 is measured. The amount of liquid remaining in the cup 49 can be measured by merely observing the level of liquid in the cup 49 with respect to the calibrations or indicia 51 of the cup 49. The method may also include the step of inserting the evaporation seal means 57 into the first tube member 21 to reduce evaporation loss from the reservoir 13.

Although the invention has been described and illustrated with respect to a preferred embodiment thereof and a preferred use therefore, it is not to be so limited since changes and modifications may be made therein which are within the full intended scope of the invention.

I claim:

1. An improved method of detecting leaks in an underground liquid storage reservoir of the type including a hollow tank having a top portion located beneath the ground surface, and including one or more hollow tube members extending upwardly above said top portion of said tank and communicating the interior of said tank with said ground surface, the combined cross-sectional area of said tube members being greatly less than the cross-sectional area of the tank, said method comprising: filling said reservoir with liquid until the level of the liquid rises into said tube members and is above said top portion of said tank and below said ground surface; measuring any change in the level of the liquid in one of said tube members over a period of time; and measuring any change in the temperature of the liquid in said reservoir over the same said period of time that any change in the level of the liquid in said one of said tube members is measured; wherein said improvement comprises: determining any change of elevation of the surface of the liquid in said one of said tube members due to evaporation from that surface over the same said period of time that any change in the level of the liquid in said one of said tube members is measured.

2. The improved method of claim 1 in which the step of determining any change of elevation due to evaporation includes:

(a) filling a cup with a specific amount of the liquid;
(b) suspending said cup within said one of said tube members at a position just above the surface of the liquid in said one of said tube members; and
(c) measuring the amount of liquid remaining in said cup after the same said period of time that any change in the level of the liquid in said one of said tube members is measured.

3. The improved method of claim 2 in which said cup is calibrated and in which the amount of liquid remaining in said cup after the same said period of time is measured by observing the level of the liquid in said cup with respect to the calibrations of said cup.

4. The improved method of claim 1 in which is included the step of inserting an evaporation seal means into said one of said tube members to reduce evaporation loss from said reservoir.

5. An improved device for detecting leaks in an underground liquid storage reservoir of the type including a hollow tank having a top portion located beneath the ground surface, and including one or more hollow tube members extending upward above said top portion of said tank and communicating the interior of said tank with said ground surface, the combined cross-sectional areas of said tube members being greatly less than the cross-sectional area of the tank, said device comprising: indicator means for detecting and indicating any change in the level of the liquid in one of said tube members over a period of time and temperature sensing means for indicating any change in temperature of the liquid in said tank over the same said period of time; wherein the improvement comprises: monitor means for allowing any change of elevation of the surface of the liquid in said one of said tube members due to evaporation from that surface over the same said period of time to be determined.

6. The improved device of claim 5 in which said monitor means includes a cup for holding a specific amount of the liquid and for being positioned within said one of said tube members just above the surface of the liquid in said one of said tube members.

7. The improved device of claim 6 in which said cup is calibrated.

8. The improved device of claim 7 in which said cup is transparent.

9. The improved device of claim 7 in which said monitor means includes suspension means for suspensing said cup within said one of said tube members.

10. The improved device of claim 5 in which is included an evaporation seal means for reducing evaporation loss from said reservoir.

* * * * *